United States Patent [19]

Herning et al.

[11] 4,110,197
[45] Aug. 29, 1978

[54] HYDROCARBON CONVERSION WITH GRAVITY-FLOWING CATALYST PARTICLES

[75] Inventors: Joel G. Herning; James B. Shelton, both of Des Plaines, Ill.

[73] Assignee: UOP Inc., Des Plaines, Ill.

[21] Appl. No.: 796,276

[22] Filed: May 12, 1977

Related U.S. Application Data

[63] Continuation-in-part of Ser. No. 650,471, Jan. 19, 1976, abandoned.

[51] Int. Cl.$^2$ ............................ C10G 23/08; C10G 35/12
[52] U.S. Cl. .......................................... 208/64; 208/165; 208/169
[58] Field of Search .................... 208/64, 65, 165, 169

[56] References Cited

U.S. PATENT DOCUMENTS

| | | | |
|---|---|---|---|
| 2,335,610 | 11/1943 | Plummer | 208/64 |
| 2,374,109 | 4/1945 | Layng et al. | 208/64 |
| 2,971,902 | 2/1961 | Blome et al. | 208/65 |
| 3,647,680 | 3/1972 | Greenwood et al. | 208/65 |
| 3,706,536 | 12/1972 | Greenwood et al. | 208/65 |

*Primary Examiner*—Herbert Levine
*Attorney, Agent, or Firm*—James R. Hoatson, Jr.; Robert W. Erickson; William H. Page, II

[57] ABSTRACT

A multiple-stage catalytic conversion system in which a hydrocarbonaceous charge stock and hydrogen flow serially through a plurality of catalytic reaction zones in each of which the catalyst particles are movable via gravity-flow. The reaction product effluent from each zone, in admixture with added hydrogen is heated prior to the introduction thereof into the succeeding reaction zone. The proportions of added hydrogen (portions of a recycled hydrogen-rich phase) are such that (i) vapor density decreases, and, (ii) lateral pressure drop across the catalyst bed increases in the direction of reactant stream flow through the plurality of reaction zones. The disclosed technique alleviates problems associated with the occurrence of stagnant catalyst areas as a result of catalyst particles being "pinned" within the reaction zone and thus unable to assume a downward gravity-flow pattern. In addition, the technique allows utilization of excess heater capacities before and between reaction zones.

10 Claims, 1 Drawing Figure

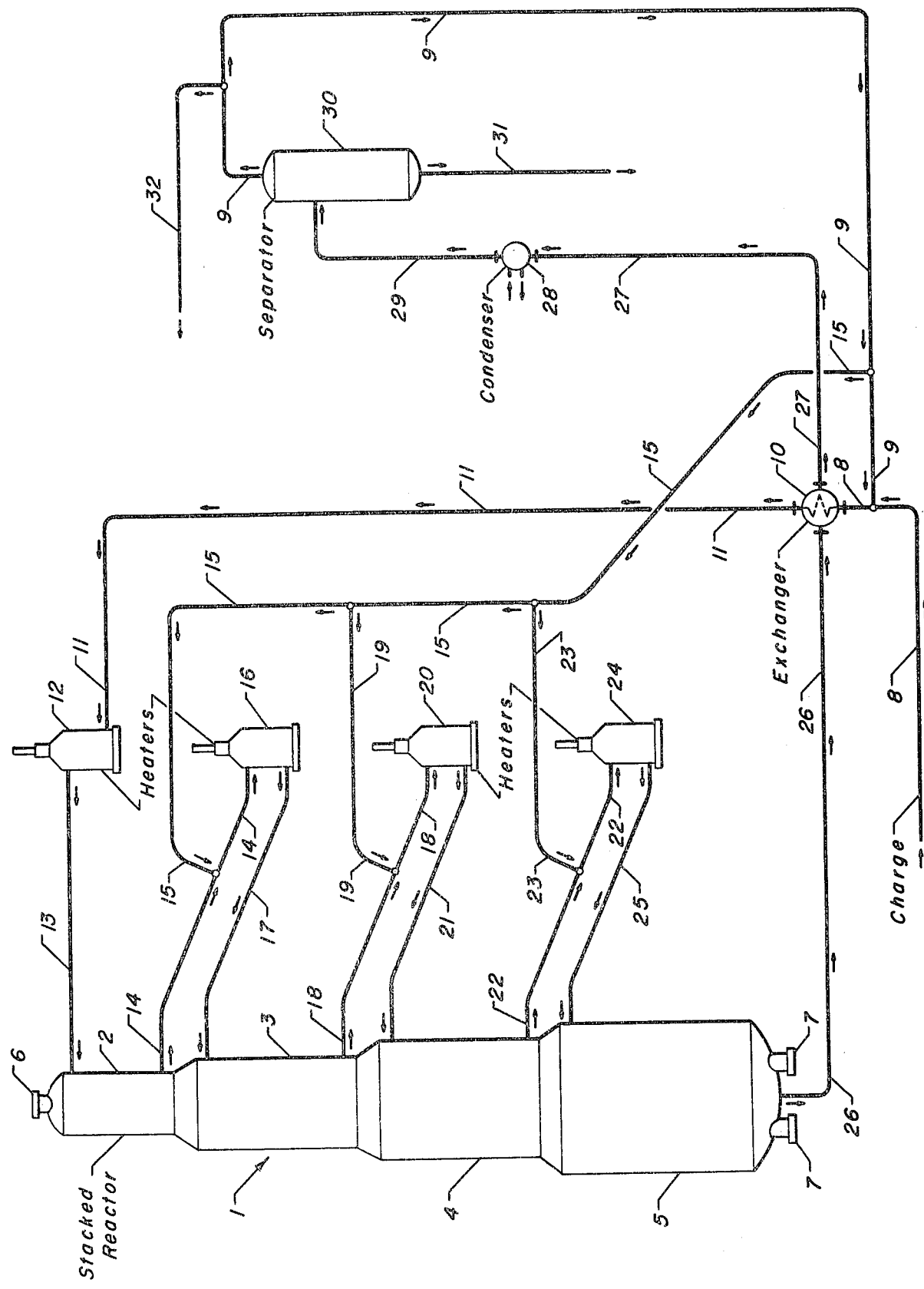

4,110,197

HYDROCARBON CONVERSION WITH GRAVITY-FLOWING CATALYST PARTICLES

RELATED APPLICATION

This application is a Continuation-In-Part of our co-pending application Ser. No. 650,471, filed Jan. 19, 1976 and now abandoned. All the teachings of said copending application are incorporated herein by specific reference thereto.

APPLICABILITY OF INVENTION

The present invention is directed toward an improved technique for effecting the catalytic conversion of a hydrocarbonaceous reactant stream in a multiple-stage reaction system wherein (1) the reactant stream flows serially through the plurality of reaction zones; (2) the catalyst particles are movable through each reaction zone via gravity-flow; and, (3) the volumetric distribution of catalyst particles increases in the direction of charge stock flow through the reaction zones. More particularly, the described process technique is adaptable for utilization in vapor-phase systems where the conversion reactions are principally endothermic, and where the flow of the hydrocarbonaceous reactant stream, with respect to the direction of movement of the catalyst particles, is cocurrent, and essentially radial.

Various types of multiple-stage reaction systems have found widespread utilization throughout the petroleum and petrochemical industires for effecting multitudinous reactions, especially hydrocarbon conversion reactions. Such reactions are either exothermic, or endothermic, and both hydrogen-producing and hydrogen-consuming. Multiple-stage reaction systems are generally of two types: (1) side-by-side configuration with intermediate heating between the reaction zones, and wherein the reactant stream or mixture flows serially from one zone to another zone; and, (2) a stacked design wherein a single reaction chamber, or more, contains the multiple catalytic contact stages. Such systems, as applied to petroleum refining, have been employed to effect numerous hydrocarbon conversion reactions including those which are prevalent in catalytic reforming, alkylation, ethylbenzene dehydrogenation to produce styrene, other dehydrogenation processes, etc. Our invention is specifically intended for utilization in processes where the conversion reactions are effected in vapor-phase, and where (1) the reaction system exists in side-by-side relation, or (2) two or more catalytic contact zones are "stacked" and, (3) where one or more additional reaction zones are disposed in side-by-side relationship with the stack. Since catalytic particles which are movable through a reaction system by way of gravity-flow are necessarily moving in a downwardly direction, the present process contemplates the withdrawal of catalyst particles from a bottom portion of one reaction zone and the introduction of fresh, or regenerated catalyst particles into the top portion of a second reaction zone. Our invention is also intended to be applied to those reaction systems wherein the catalyst is disposed as an annular bed and the flow of the reactant stream, serially from one zone to another reaction zone, is perpendicular, or radial to the movement of catalyst particles, and where the volumetric distribution of catalyst particles increases in the direction of reactant stream flow through the plurality of reaction zones in the system.

A radial-flow reaction system generally consists of tubular-form sections, of varying nominal cross-sectional areas, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area less than the catalyst-retaining screen. The reactant stream is introduced in vapor-phase, into the annular-form space created between the inside wall of the chamber and the outside surface of the catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Although the tubular-form configuration of the various reactor components may take any suitable shape — i.e., triangular, square, oblong, diamond, etc. — many design, fabrication and technical considerations indicate the advantages of using components which are substantially circular in cross-section.

Illustrative of a multiple-stage stacked reactor system, to which the present invention is particularly adaptable, is that shown in U.S. Pat. No. 3,706,536 (Cl. 23-288G), issued Dec. 19, 1972. As indicated, the transfer of the gravity-flowing catalyst particles from one reaction zone to another, as well as introduction of fresh catalyst particles and withdrawal of "spent" catalyst particles, is effected through the utilization of a plurality of catalyst-transfer conduits. Experience in the use of such systems, as well as those where the reaction zones are disposed in a side-by-side relationship indicates that the high vapor flow laterally through the annular-form catalyst-holding sections results in catalyst particles being pinned in the vicinity of the perforated centerpipe thus creating stagnant catalyst areas where the catalyst particles are prevented from assuming the gravity-flow pattern.

OBJECTS AND EMBODIMENTS

A principal object of our invention is to prevent catalyst "pinning" in a hydrocarbon conversion system in which catalyst particles are movable via gravity-flow. A corollary objective is to provide an improved processing technique for use in a multiple-stage, stacked reactor system in which catalyst particles in each reaction zone are movable via gravity-flow, and catalyst particles flow from one zone to the next succeeding zone by way of gravity-flow.

Another object attainable through the use of our inventive concept is the advantageous distribution of the overall heat of reaction in a multiple-stage, substantially endothermic hydrocarbon conversion system effected in vapor-phase and wherein the catalyst particles are downwardly movable via gravity-flow.

Therefore, in a multiple-stage catalytic conversion system, wherein (1) heated hydrocarbonaceous charge stock and hydrogen flow serially through a plurality of catalytic reaction zones; (2) the reaction product effluent from each zone is heated prior to the introduction thereof into the next succeeding reaction zone; (3) catalyst particles are movable through each reaction zone via gravity-flow; and, (4) catalyst distribution, by volume, increases in the direction of charge stock flow through said reaction zones, our invention encompasses the method of converting said charge stock which comprises the steps of: (a) heating said charge stock and hydrogen and introducing the heated mixture into a first reaction zone maintained at hydrocarbon conversion conditions; (b) heating the resulting first reaction zone effluent in admixture with added hydrogen and introducing the total heated mixture into a succeeding reaction zone maintained at hydrocarbon conversion conditions; (c) separating the effluent from the last reaction zone in said plurality to provide (i) a normally liquid product stream and, (ii) a hydrogen-rich vaporous phase; (d) admixing a first portion of said hydrogen-rich phase with said charge stock prior to heating, and admixing a second portion of said hydrogen-rich phase with said first reaction zone effluent prior to heating, the ratio of said first and second portions of said hydrogen-rich phase selected to provide (i) decreasing vapor density and, (ii) increasing lateral pressure drop, in the direction of charge stock flow through said reaction zones; (e) at least periodically withdrawing catalyst particles from one of said reaction zones; and, (f) at least periodically introducing fresh, or regenerated catalyst particles into another of said reaction zones.

A more specific embodiment of the present invention is directed toward a multiple-stage hydrocarbon catalytic reforming process which comprises the steps of: (a) heating hydrocarbon charge stock and hydrogen and introducing the heated mixture into a first catalytic reaction zone in which catalyst particles are movable via gravity-flow; (b) heating the resulting first zone effluent, in admixture with added hydrogen, and introducing the total heated mixture into a second reaction zone in which catalyst particles are movable via gravity-flow; (c) heating the resulting second reaction zone effluent, in admixture with added hydrogen, and introducing the heated mixture into a third reaction zone in which the catalyst particles are movable via gravity-flow; (d) heating the resulting third reaction zone effluent and introducing the heated effluent into a fourth reaction zone in which the catalyst particles are movable via gravity-flow, the catalyst volumetric distribution increasing in the direction of charge stock flow through said four reaction zones; (e) separating the resulting fourth reaction zone effluent to provide (i) a normally liquid product stream and, (ii) a hydrogen-rich vaporous phase; (f) admixing a first portion of said vaporous phase with said charge stock prior to heating, a second portion with said first reaction zone effluent prior to heating and a third portion with said second reaction zone effluent prior to heating, the ratios of said first, second and third portions of said hydrogen-rich phase selected to provide (i) decreasing vapor density and, (ii) increasing lateral pressure drop, in the direction of charge stock flow through said reaction zones; (g) at least periodically withdrawing catalyst particles from said fourth reaction zone; and, (h) at least periodically introducing fresh, or regenerated catalyst particles into said first reaction zone.

These, as well as other objects and embodiments will become evident from the following, more detailed description of the present hydrocarbon conversion process. In one such other embodiment, the four catalytic reforming reaction zones are disposed as a vertical stack having a common vertical axis, and catalyst particles are movable from one reaction zone to the next succeeding reaction zone via gravity-flow.

PRIOR ART

Candor compels recognition of the fact that various types of hydrocarbon conversion processes utilize multiple-stage reaction systems, either in side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While our inventive concept is adaptable to many conversion reactions and processes, through the reaction system of which the catalyst particles are movable via gravity-flow, the same will be additionally described in conjunction with the well-known endothermic catalytic reforming process.

Historically, the catalytic reforming process was effected in a non-regenerative, fixed-bed system comprising a plurality of reaction zones in side-by-side relation. When the catalytic composite had become deactivated to the extent that continuous operation was no longer economically feasible, the entire unit was shut-down and the catalyst regenerated in situ. Of more recent vintage was the so-called "swing bed" system in which an extra reactor was substituted for one which was due to be placed off-stream for regeneration purposes. Still more recently, multiple-stage reactor systems have been provided in which the catalyst particles flow, via gravity, through each reaction zone. In a "stacked" system, the catalyst particles also flow downwardly from one catalyst-containing zone to another and ultimately transfer to a suitable regeneration system also preferably functioning with a downwardly moving bed of catalyst particles. In effect, the catalyst particles are maintained from one section to another in a manner such that the flow of catalyst particles is continuous, at frequent intervals, or at extended intervals, with the movement being controlled by the quantity of catalyst withdrawn from the last of the series of individual reaction zones.

U.S. Pat. No. 3,470,090 (Cl. 208-138) issued Sept. 30, 1969 illustrates a multiple-stage, side-by-side reaction system with intermediate heating of the reactant stream which flows serially through the individual reaction zones. Catalyst withdrawn from any one of the reaction zones is transported to suitable regeneration facilities. A system of this type can be modified to the extent that the catalyst particles withdrawn from a given reaction zone are transported to the next succeeding reaction zone, while that catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone in the plurality to the top of the catalyst regeneration zone is possible through the technique illustrated in U.S. Pat. No. 3,839,196 (Cl. 208-174), issued Oct. 1, 1974.

A stacked reaction configuration is shown in U.S. Pat. No. 3,647,680 (Cl. 308-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288G), issued Sept. 19, 1972 and U.S. Pat. No. 3,725,249 (Cl. 208-139), issued Apr. 3, 1973. Perusal of these publications reveals only an awareness that a multiple-stage catalytic reforming process, in view of the multiplicity of individual reactions and complexity thereof, is more advantageously effected with unequal catalyst distribution which increases in the direction of reactant stream flow through the plurality of reaction zones. There is no recognition whatsoever that "catalyst pinning" exists in such gravity-flowing systems, and certainly no suggestion to the solution as herein described.

U.S. Pat. No. 3,725,248 (Cl. 208–138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities.

As hereinbefore stated, general details of a three reaction zone, stacked system are presented in U.S Pat. No. 3,706,536 (Cl. 23–288G), issued Dec. 19, 1972, and illustrates one type of multiple-stage system to which the present inventive concept is applicable. It should be noted, as generally practiced in a catalytic reforming unit, that each succeeding reaction zone contains a greater volume of catalyst, and that the annular-form catalyst-holding zone is greater in cross-sectional area.

These illustrations are believed to be fairly representative of the art which has developed in the multiple-stage conversion systems wherein catalyst particles are movable through each reaction zone via gravity-flow. Noteworthy is the fact that none recognize the existence of stagnant catalyst areas resulting when catalyst particles are pinned to the perforated centerpipe by the radial/lateral vapor flow across the annular-form catalyst bed. Likewise, it is readily ascertained that there is no recognition of splitting the hydrogen flow to alleviate these difficulties and remedy the problem.

U.S. Pat. No. 3,864,240 (Cl. 208–64), issued Feb. 4, 1975, is illustrative of the integration of a reaction system having gravity-flowing catalyst particles with a fixed-bed system. As stated in this reference, one of the advantages resides in revamping an existing three reaction zone, fixed-bed system to conform to the integrated system. In such a modification, it is suggested that a second compressor be added to permit the split-flow of hydrogen-rich recycle gas as also described in U.S. Pat. No. 3,516,924 (Cl. 208–65), issued June 23, 1970. The use of the additional compressor would be to supply the necessary hydrogen recycle to the moving-bed portion of the system, while the original compressor supplies the hydrogen recycle to the plurality of fixed-bed reaction zones. Again, there is no recognition of the difficulties attendant catalyst pinning in the zone where the catalyst particles are movable via gravity-flow. Quite obviously, this pinning problem is non-existent in a fixed-bed reaction system wherein the entire catalyst bed remains motionless. Furthermore, the moving bed reaction zone must handle all the vaporous material in the system including the recycle hydrogen from its own compressor and the total effluent from the last fixed-bed reaction zone.

Split-flow hydrogen recycle is recognized in the literature directed toward conversion systems in which the catalytic reaction zones are of the annular-form, fixed-bed configuration. For example, U.S. Pat. No. 2,938,853 (Cl. 208–65), issued May 31, 1960, indicates that the separated hydrogen-rich phase may be recycled in part to all the reaction zones where desired. Similarly, U.S. Pat. No. 3,392,107 (Cl. 208–65), issued July 9, 1968, illustrates a four, fixed-bed reaction zone system in which the hydrogen recycle is split to the first and the fourth reaction zones in the series. No recycle hydrogen is added to the second and third reaction zones, and the split of the recycle hydrogen is such that approximately one-sixth is introduced into the first reaction zone and the remaining five-sixths is added to the effluent from the third reaction zone prior to the introduction thereof into the last reaction zone. To reiterate, a catalyst pinning problem is non-existent in fixed-bed catalytic reaction zones, notwithstanding the catalyst particles being disposed therein as an annular-form bed through which the reactant stream flows laterally and radially. Certainly, there is no indication that split-flow of the hydrogen recycle is effected in proportions selected to provide simultaneously decreasing vapor density and increasing lateral pressure drop in the direction of reactant stream flow through the plurality of reaction zones. Many other such fixed-bed systems could be specifically delineated herein; they are, however, believed to be only cumulative to the foregoing.

U.S. Pat. No. 2,374,109 (Cl. 208–64), issued Apr. 17, 1945, discloses, as an alternative technique, a stacked reactor system having three individual reaction zones and a regeneration zone below the lowermost reaction zone (shown in FIG. 2 thereof). The main thrust of the described catalytic reforming processes involves the conversion system wherein no hydrogen, including recycled hydrogen, is added to the first, or initial reaction zone. Recycled hydrogen is split to supply the second and third reaction zones, although certain advantages are stated as being attainable even though a portion of the recycled hydrogen is introduced into the first reaction zone. It is clear that the intent is to conduct the first reaction zone conversion in the absence of added hydrogen. In discussing the so-called moving-bed system, the statement is made that the catalyst chambers are maintained substantially full of catalyst at all times. There is, therefore, no lateral/radial flow of the reactant stream through an annular-form catalyst bed defined by a catalyst-retaining screen and a perforated centerpipe. In short, there exists no catalyst "pinning" problems resulting from the lateral flow of vapors across the catalyst bed. In fact, there is a preference for recycling up to three volumes of the first zone effluent (liquid basis) per volume of liquid naphtha charge thereto. One stated advantage of this technique is the resulting increase in linear velocity flow through the catalyst chamber which, it is further stated, tends to prevent the accumulation of highly carbonaceous materials on the catalyst. This technique actually offers detrimental effects: first, there will occur degradation of the dehydrogenated naphtha products in the recycled material; and, the deposition of coke and other carbonaceous material will tend to increase. Of greater significance, however, is that the increased vapor velocity would further compound the difficulties attendant catalyst pinning.

U.S. Pat. No. 2,335,610 (Cl. 208–64), issued Nov. 30, 1943, is virtually cumulative to the above with respect to the moving-bed system (again as shown in FIG. 2 thereof). Here, however, the fresh feed naphtha charge stock is subjected to split-flow to the three conversion reaction zones. Each resulting product effluent is individually separated to recover varying "grades" of hydrogen, the normally liquid portions being immediately combined and transported to fractionation facilities. In effect, the technique involves three unrelated and independent individual reaction zones insofar as the reactant stream is concerned. Especially noteworthy is the lack of detailed information relative to the hydrogen/hydrocarbon mole ratio in any one, or all of the three reaction zones. The sole disclosure indicates a broad mole ratio range of 0.4:1.0 to about 8.0:1.0. As above, there is no lateral/radial flow of the reactant stream across an annular-form catalyst bed, no recognition of a catalyst pinning problem and no awareness of unequal catalyst distribution which increases in the direction of reactant stream flow serially through the plurality of reaction zones.

In brief summation, the prior art which is directed toward moving-bed catalytic conversion systems is not cognizant of the existence of a catalyst pinning problem and its attendant difficulties. Further, the particular split-flow hydrogen recycle solution, on which the present inventive concept is founded, is not recognized. That is, that the ratios, or proportions of the hydrogen recycle splitting are selected to provide (1) decreasing vapor density and, (2) increasing lateral pressure drop, in the direction of reactant stream flow serially through the plurality of reaction zones. In the same vein, while some of the prior art directed toward fixed-bed systems indicates an awareness of split-flow hydrogen recycle, in such systems the catalyst pinning problem does not exist.

SUMMARY OF INVENTION

As hereinbefore set forth, the process encompassed by our inventive concept is suitable for use in hydrocarbon conversion systems characterized as multiple-stage and in which catalytic particles are movable, via gravity-flow, in each reaction zone. Furthermore, the present invention is principally intended for utilization in systems where the principal reactions are endothermic, and are effected in a vapor-phase operation. Although the following discussion is specifically directed toward catalytic reforming of naphtha boiling range fractions, there is no intent to so limit the present invention. Catalytic reforming, as well as many other processes, has experienced several phases of development currently terminating in a system in which the annular-form catalyst beds assume the character of a descending column in one or more reaction vessels. Typically, the catalysts are utilized in spherical form having a nominal diameter ranging from about 1/32-inch to about 5/32-inch in order to offer free-flow characteristics which will neither bridge, nor block the descending column, or columns of catalyst within the overall system. In one such multiple-stage system, the reaction chambers are vertically stacked, and a plurality (generally from 6 to 16) of relatively small diameter conduits are employed to transfer catalyst particles from one reaction zone to the next lower reaction zone (via gravity-flow) and ultimately as withdrawn catalyst from the last reaction zone. The latter are usually transported to the top of a catalyst regeneration facility, also functioning with a descending column of catalyst particles; regenerated catalyst particles are transported to the top of the upper reaction zone of the stack. In order to facilitate and enhance gravity-flow within each reaction vessel, as well as from one to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the succeeding zone, and from the last reaction zone to the top of the regeneration facility.

Catalytic reforming of naphtha boiling range hydrocarbons, a vapor-phase operation, is effected at conversion conditions which include catalyst bed temperatures in the range of about 700° F. to about 1020° F.; judicious and cautious techniques generally dictate that catalyst temperatures not substantially exceed a level of about 1020° F. Other conditions include a pressure from about 50 psig. to about 1000 psig., a liquid hourly space velocity (defined as volumes of fresh charge stock per hour, per volume of total catalyst particles) of from 0.2 to about 10.0 and a hydrogen to hydrocarbon mole ratio from about 1.0:1.0 to about 10.0:1.0. As those possessing the requisite skill in the refining art are aware, the described continuous regenerative reforming system offers numerous advantages when compared to the prior fixed-bed systems. Among these is the capability of efficient operation at lower pressures — e.g. 50 psig. to about 150 psig. — and higher liquid hourly space velocities — e.g. 3.0:1.0 to about 8.0:1.0. Further, as a result of continuous catalyst regeneration, higher consistent inlet catalyst bed temperatures can be maintained — e.g. 950° F. to about 1010° F. There can also exist a corresponding increase in both hydrogen production and hydrogen purity in the recycled vaporous phase from the product separator.

Catalytic reforming reactions are multifarious, and include the dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions are effected through the use of one or more Group VIII noble metals (e.g. platinum, iridium, rhodium) combined with a halogen (e.g. chlorine and/or fluorine) and a porous carrier material such as alumina. Recent investigations have indicated that more advantageous results are attainable and enjoyed through the cojoint use of a catalytic modifier; these are generally selected from the group of cobalt, nickel, gallium, germanium, tin, rhenium, vanadium and mixtures thereof. Regardless of the particular selected catalytic composite, the ability to attain the advantages over the common fixed-bed systems is greatly dependent upon achieving acceptable catalyst flow downwardly through the system. Not only must this be substantially uniform throughout the cross-section of the annular-form catalyst bed, but stagnant areas must be maintained at the most achievable minimum.

Catalytic reforming is a well known process which has been thoroughly described in the literature, having been a commercially important tool of the petroleum refining industry for more than a quarter of a century. One of the many things gleaned from the vast amount of reforming experience and resulting knowledge is the soundness of utilizing multiple stages, each of which contains a different quantity of catalyst, expressed generally as volume percent. The reactant stream, hydrogen and the hydrocarbon feed, flows serially through the reaction zones in order of increasing catalyst volume with, of course, interstage heating. In a three reaction zone system, typical catalyst loadings are: first, 10.0% to about 30.0%; second, from 20.0% to about 40.0%; and, third, from about 40.0% to about 60.0%. With respect to a four reaction zone system, suitable catalyst loading would be: first, 5.0% to about 15.0%; second, 15.0% to about 25.0%; third, 25.0% to about 35.0%; and, fourth, 35.0% to about 50.0%. Unequal catalyst distribution, increasing in the serial direction of reactant stream flow, facilitates and enhances the distribution of the multiplicity of reactions, the temperature differential, or average bed temperature, in each of the reaction zones and the overall heat of reaction, consistent with predetermined charge stock characteristics.

As hereinbefore stated, catalyst pinning to the outer periphery of the centerpipe stems primarily from high vapor velocity laterally across the annular-form catalyst-holding zone, this adverse effect increasing in degree as the cross-sectional area and length of the catalyst bed is decreased. In multiple-stage catalytic reforming systems, therefore, the effect is most pronounced in the first and second reaction zones (having the smaller annular-form cross-sectional area), somewhat less in the third reaction zone and of minor consequence in the fourth reaction zone as a result of its length and larger cross-sectional catalyst area. The current operating technique involves separating the effluent from the last reaction zone, in a high-pressure separator at a temperature of about 60° F. to about 140° F., to provide a normally liquid product stream and a hydrogen-rich vaporous phase. A portion of the latter (the remainder being vented on pressure control) is combined with the fresh charge stock for introduction into a heater to achieve reaction temperature and passed therewith into the first reaction zone. In accordance with the present procedure, not all of the recycled hydrogen-rich phase is introduced into the first reaction zone. A first portion is diverted, combined with the total first zone effluent, is reheated therewith to reaction temperature by means of an interheater and introduced into the second reaction zone; and, a second portion is combined with the total second reaction zone effluent, is reheated therewith to reaction temperature by means of an interheater and introduced into the third reaction zone. This decreases the total vapor flow in the first and second reaction zones to the extent that catalyst pinning is substantially alleviated.

Investigations have indicated that the degree of catalyst pinning, as measured from 100.0% free-flowing (downwardly via gravity) to 100.0% pinned, is principally a function of two variables, the vapor density within the reaction zone and the total mass flow to the reaction zone. Of course, these variables will depend initially on the chemical and physical characteristics of the fresh feed charge stock which also determines the number of individual reaction zones (whether three or four) and the unequal catalyst distribution (or dimensions of the annular-form catalyst bed). For a given single reaction zone, as vapor density increases with mass flow constant, less catalyst will be pinned, if any, or there will be completely free-flowing catalyst particles. Similarly, as mass flow increases with vapor density constant, a greater degree of catalyst pinning will be experienced. For a given multiple-stage system, where catalyst distribution is unequal and increases in the direction of reactant stream flow, the vapor density/mass flow correlation indicates that lower vapor densities can be tolerated as the reactant stream serially traverses the plurality of reaction zones. In accordance with our inventive concept, the recycled hydrogen-rich vaporous phase is subject to split-flow in portions which are selected to provide (1) decreasing vapor density and, (2) increasing lateral pressure drop, in the direction and reactant stream flow through the plurality of reaction zones. Thus, where the flow, in a four-zone system is I, II, III and IV, reaction zone I will have the highest vapor density and lowest lateral pressure drop, while reaction zone IV will have the lowest vapor density and highest lateral pressure drop.

It is not generally necessary to divert a portion of the recycled hydrogen-rich gas to the last or bottom reaction zone. However, this technique may be included as an additional tool for effecting the optimum utilization of the reaction zone interheaters such that the reaction zone inlet temperatures in the plurality of reaction zones can be made to exhibit a substantially equal profile which results in an ascending average catalyst bed temperature through the zones in the direction of reactant stream flow. Average catalyst bed temperatures are principally, but not totally dependent upon the catalyst bed inlet temperatures which are subject to control. An ascending average catalyst bed temperature, achieved via a substantially equal inlet temperature profile is preferred in order to improve selectivity.

When a catalytic reforming system is being designed, the principal considerations constitute a detailed charge stock analysis and the intended octane rating of the normally liquid product. Generally, based upon previous experience, an estimate is prepared which indicates the range of the various operating variables required to maximize the volumetric yield of the desired product. Important aspects of the estimate are, the overall heat of reaction to be anticipated, the recommended catalyst distribution among the plurality of reaction zones in the system and, ultimately, the design capacity of the charge heater and reaction zone inter-heaters. As hereinbefore stated, when a given unit is in operation, sound technical considerations dictate control of the inlet temperature profile (average catalyst bed temperature profile), consistent with the desired product distribution. These are constantly affected by changes in the composition of the feed stream as well as fluctuations in the flow rate thereof. The added advantage of our invention resides in the capability to adjust for such changes in feedstock properties, product requirements, and various operating conditions and thus maintain the desired reaction zone temperature profile.

BRIEF DESCRIPTION OF DRAWING

In further describing the present invention, and the method of operation, reference will be made to the accompanying drawing. It is understood that the drawing is presented solely for the purposes of illustration, and the same is not intended to be construed as limiting upon the scope and spirit of our invention as defined by the appended claims. Therefore, miscellaneous appurtenances, not required for a complete understanding of the inventive concept, have been eliminated or reduced in number. Such items are well within the purview of one possessing the requisite skill in the appropriate art. The illustrated embodiment is presented as a simplified schematic flow diagram showing a four reaction zone, stacked catalytic reforming system 1, having a charge heater 12 and reaction zone inter-heaters 16, 20 and 24.

DETAILED DESCRIPTION OF DRAWING

The stacked, gravity-flowing catalyst system 1 is shown as having four individual radial-flow reaction zones 2, 3, 4 and 5. These are sized both as to length and cross-sectional annular catalyst area such that the distribution of the total catalyst volume is 10.0%, 15.0%, 25.0% and 50.0%, respectively. In a normal, substantially problem-free operation, fresh or regenerated catalyst particles are introduced through inlet port 6 into the uppermost zone 2, and flow via gravity therefrom into reaction zone 3, from zone 3 into zone 4, from zone 4 into zone 5, and are ultimately withdrawn from the system through a plurality of outlet ports 7. Catalyst particles so removed may be transported to a continuous regeneration zone (not illustrated), or may be stored until a sufficient quantity is available for batchwise regeneration. The rate of catalyst flow through the system, or the period of time required for catalyst particles to be introduced into the system, traverse the four reaction zones and be withdrawn for regeneration is determined by the rate at which the latter is effected. By monitoring various operating parameters while the system is in continuous operation, the catalyst withdrawal rate, or regeneration load can be controlled.

For illustration purposes, it will be presumed that a catalyst pinning problem, as hereinbefore described has developed, principally in reaction zones 2 and 3, and somewhat less severe in reaction zone 4. Further, that the distribution of the overall heat of reaction has become detrimental to the optimum operation as a result of both composition change and flow rate of the feedstock introduced through conduit 8. As a result, charge heater 12 is functioning as if it were underdesigned, while inter-heaters 16 and 20 are performing as if they were overdesigned. With respect to reaction zone 5 and interheater 24, it will be additionally presumed that such difficulties are minimal and do not, therefore, exert a serious detrimental effect upon the operation.

The naphtha boiling range charge stock is introduced via line 8, admixed with a first portion of a hydrogen-rich gaseous phase from line 9 and is introduced into heat-exchanger 10. The thus-heated mixture continues through line 11 into charge heater 12, wherein the temperature is further elevated to the level necessary to provide the temperature desired at the inlet to the first catalyst bed. The combined charge stock and hydrogen enters the stacked reaction zone system by way of line 13.

The reaction product effluent from catalyst zone 2 is introduced via conduit 14, in admixture with a second portion of hydrogen-rich vaporous phase in line 15, into inter-heater 16 wherein the temperature is increased; the heated mixture is introduced into reaction zone 3 through line 17. Reaction product effluent from zone 3 is withdrawn through conduit 18, admixed with a third portion of hydrogen-rich recycle gas in line 19 and passed into inter-heater 20; the heated mixture is passed via conduit 21 into reaction zone 4. Conduit 22 carries the effluent from reaction zone 4, in admixture with another portion of the hydrogen-rich gaseous phase from line 23, into inter-heater 24, and the heated mixture is introduced via line 25 into lowermost reaction zone 5. As hereinbefore stated, the catalyst pinning problem is seldom found in the lowermost reaction zone; however, conduit 23 which supplies the hydrogen-rich gas to inter-heater 24 is provided to afford, where needed, an additional tool for maintaining the proper distribution of the overall heat of reaction.

The product effluent from lowermost reaction zone 5 is withdrawn via line 26 and introduced as the heat-exchange medium into heat-exchanger 10. Exiting by way of line 27, the effluent is passed into condenser 28, wherein the temperature is further decreased to a level within the range of about 60° F. to about 140° F., the condensed material passing via line 29 into separator 30. The condensed material is removed through line 31 and transported thereby to suitable fractionation facilities designed to recover the normally liquid product.

A portion of the hydrogen-rich vaporous phase recovered in line 9 is removed from the reforming system through line 32, generally on pressure control. This excess hydrogen is of value for use in other units of the refinery, particularly those processes in which hydrogen is consumed. A portion of the remaining hydrogen-rich recycle gas in line 9 is diverted through line 15 in an amount to satisfy the total introduced into inter-heaters 16, 20 and 24 through lines 15, 19 and 23, respectively.

Through the implementation of the present invention, as above described, the catalyst pinning problem which adversely affects uniform catalyst flow throughout the system is substantially alleviated, and the entire operation is optimized as a result of the technique which affords utilization of interheater duty capacities available as a result of distribution changes in the heat of reaction.

We claim as our invention:

1. In a multiple-stage catalytic conversion system, wherein (1) heated hydrocarbonaceous charge stock and hydrogen flow serially through a plurality of catalytic reaction zones; (2) the reaction product effluent from each zone is heated prior to the introduction thereof into the next succeeding reaction zone; (3) catalyst particles move as an annular bed through each reaction zone via gravity-flow; and, (4) catalyst distribution, by volume increases in the direction of charge stock flow through said reaction zones, the method of converting said charge stock which comprises the steps of:
   (a) heating said charge stock and hydrogen and introducing the heated mixture into a first reaction zone maintained at hydrocarbon conversion conditions;
   (b) heating the resulting first reaction zone effluent in admixture with added hydrogen and introducing the total heated mixture into a succeeding reaction zone containing a greater amount of catalyst volume than said first reaction zone maintained at hydrocarbon conversion conditions;
   (c) separating the effluent from the last reaction zone in said plurality to provide (i) a normally liquid product stream and, (ii) a hydrogen-rich vaporous phase;
   (d) admixing a first portion of said hydrogen-rich phase with said charge stock prior to heating, and admixing a second portion of said hydrogen-rich phase with said first reaction zone effluent prior to heating, the ratio of said first and second portions of said hydrogen-rich phase selected to provide (i) decreasing vapor density, and, (ii) increasing lateral pressure drop, in the direction of charge stock flow through said reaction zones;
   (e) at least periodically withdrawing catalyst particles from one of said reaction zones; and,
   (f) at least periodically introducing fresh, or regenerated catalyst particles into another of said reaction zones.

2. The method of claim 1 further characterized in that the reaction zones in said plurality are disposed in side-by-side relationship.

3. The method of claim 1 further characterized in that the reaction zones in said plurality are stacked and have a common vertical axis.

4. The method of claim 3 further characterized in that catalyst particles are at least periodically withdrawn from the lowermost reaction zone in said stack and fresh, or regenerated catalyst particles are at least periodically introduced into the uppermost reaction zone in said stack.

5. The method of claim 3 further characterized in that catalyst particles flow via gravity from one reaction zone to the next lower reaction zone in said stack containing a greater volume of catalyst particles than said upper reactor zone.

6. The method of claim 1 further characterized in that said plurality consists of three reaction zones.

7. The method of claim 1 further characterized in that said plurality consists of four reaction zones, and hydrogen is added to both the first reaction zone effluent and the second reaction zone effluent prior to the heating thereof.

8. A multiple-stage hydrocarbon catalytic reforming process which comprises the steps of:
  (a) heating hydrocarbon charge stock and hydrogen and introducing the heated mixture into a first catalytic reaction zone in which catalyst particles move as an annular bed via gravity-flow;
  (b) heating the resulting first reaction zone effluent in admixture with added hydrogen and introducing the total heated mixture into a second reaction zone in which catalyst particles move as an annular bed via gravity-flow;
  (c) heating the resulting second reaction zone effluent and introducing the heated effluent into a third reaction zone in which catalyst particles move as an annular bed via gravity-flow, the volumetric distribution of catalyst particles increasing in the direction of charge stock flow through said three reaction zones;
  (d) separating the resulting third reaction zone effluent to provide (i) a normally liquid product stream and, (ii) a hydrogen-rich vaporous phase;
  (e) recycling a first portion of said vaporous phase to combine with said charge stock, and admixing a second portion of said vaporous phase with said first reaction zone effluent prior to heating, the ratio of said first and second portions of said vaporous hase selected to provide (i) decreasing vapor density, and (ii) increasing lateral pressure drop, in the direction of charge stock flow through said reaction zones;
  (f) at least periodically withdrawing catalyst particles from said third reaction zone; and,
  (g) at least periodically introducing fresh, or regenerated catalyst into said first reaction zone.

9. A multiple-stage hydrocarbon catalytic reforming process which comprises the steps of:
  (a) heating hydrocarbon charge stock and hydrogen and introducing the heated mixture into a first catalytic reaction zone in which catalyst particles move as an annular bed via gravity-flow;
  (b) heating the resulting first zone effluent, in admixture with added hydrogen, and introducing the total heated mixture into a second reaction zone in which catalyst particles move as an annular bed via gravity-flow;
  (c) heating the resulting second reaction zone effluent, in admixture with added hydrogen, and introducing the heated mixture into a third reaction zone in which the catalyst particles move as an annular bed via gravity-flow;
  (d) heating the resulting third reaction zone effluent and introducing the heated effluent into a fourth reaction zone in which the catalyst particles move as an annular bed via gravity-flow, the catalyst volumetric distribution increasing in the direction of charge stock flow through said four reaction zones;
  (e) separating the resulting fourth reaction zone effluent to provide (i) a normally liquid product stream and, (ii) a hydrogen-rich vaporous phase;
  (f) admixing a first portion of said vaporous phase with said charge stock prior to heating, a second portion with said first reaction zone effluent prior to heating and a third portion with said second reaction zone effluent prior to heating, the ratios of said first, second and third portions of said hydrogen-rich phase selected to provide (i) decreasing vapor density and, (ii) increasing lateral pressure drop, in the direction of charge stock flow through said reaction zones;
  (g) at least periodically withdrawing catalyst particles from said fourth reaction zone; and,
  (h) at least periodically introducing fresh, or regenerated catalyst particles into said first reaction zone.

10. The process of claim 9 further characterized in that said four reaction zones are disposed as a vertical stack having a common vertical axis, and catalyst particles are movable from one reaction zone to the next succeeding reaction zone via gravity-flow.

* * * * *